United States Patent [19]

Lake

[11] 3,959,209

[45] May 25, 1976

[54] CURABLE SOLID POLYESTER RESINS

[75] Inventor: Robert D. Lake, Monroeville, Pa.

[73] Assignee: Koppers Company, Inc., Pittsburgh, Pa.

[22] Filed: Apr. 11, 1973

[21] Appl. No.: 349,932

[52] U.S. Cl. .............................. 260/40 R; 260/861; 260/862
[51] Int. Cl.$^2$ ........................................ C08L 67/06
[58] Field of Search .................. 260/861, 40 R, 862

[56] References Cited
UNITED STATES PATENTS

| | | | |
|---|---|---|---|
| 2,388,319 | 11/1945 | Fuller | 260/861 X |
| 3,300,544 | 1/1967 | Porker | 260/861 X |
| 3,631,224 | 12/1971 | Baum | 260/861 |
| 3,652,489 | 3/1972 | Crowe et al. | 260/40 R |
| 3,701,748 | 10/1972 | Kraekel | 260/862 |

FOREIGN PATENTS OR APPLICATIONS

| | | |
|---|---|---|
| 1,419,760 | 10/1965 | France |
| 131,512 | 12/1970 | Netherlands |
| 993,378 | 5/1965 | United Kingdom |
| 1,007,168 | 10/1965 | United Kingdom |

OTHER PUBLICATIONS

Bjorksten, *Polyesters and Their Applications* (1956), p. 158 (TP986.P683).
Malotkan et al., "Prepegs Mode from Unsaturated Polyester Resins and Glass Fiber Materials", Plaste und Kautschuk, Vol. 14 pp. 482–485 (1967).

*Primary Examiner*—Donald E. Czaja
*Assistant Examiner*—S. M. Person
*Attorney, Agent, or Firm*—Oscar B. Brumback

[57] ABSTRACT

Solid curable polyester resin compositions comprising a filler or fibrous reinforcements impregnated with a solid solution of a crystalline polyester and crosslinking agent therefor are prepared by:

A. mixing a liquid crosslinking agent with a solid crystalline polyester which is insoluble in said crosslinking agent at room temperature;

B. heating the mixture of said solid crystalline polyester and liquid crosslinking agent to a temperature at which said polyester dissolves in said crosslinking agent and a temperature which is below that at which the polyester and crosslinking agent cure;

C. forming a solid solution of said polyester and crosslinking agent by cooling the heated mixture thereof; and D. mixing with the polyester and crosslinking agent prior to the formation of said solid solution one or more of a filler, fibrous reinforcements or amorphous polyester.

52 Claims, No Drawings

CURABLE SOLID POLYESTER RESINS

FIELD OF THE INVENTION

This invention relates to solid, polymerizable or curable polyester resin compositions which contain a crystalline polyester.

The fabrication of thermoset polyester resin articles from curable compositions comprising an ethylenically unsaturated polyester dissolved in a liquid ethylenically unsaturated monomeric crosslinking agent which is capable of polymerizing with said polyester is well known. Articles having relatively high strength and low density can be produced from such compositions by incorporating therein fibrous reinforcements such as glass fibers. Fillers, such as calcium carbonate and clays, are usually added to such compositions as extenders.

For convenience, the term "polyester resin" when used herein refers to a composition which contains as essential ingredients an ethylenically unsaturated polyester and an ethylenically unsaturated crosslinking agent, and which may contain other ingredients such as fillers, fibrous reinforcements, curing catalysts, etc.

Polyester resins are widely used in molding applications in liquid form. Such liquid resins comprise a liquid solution of a liquid or solid polyester dissolved in a liquid crosslinking agent, for example, styrene, the most widely used crosslinking agent. However, for many types of molding applications, it is desirable or mandatory that the polyester resin be in solid form, for example, in the form of sheets, granules or powders.

Solid forms of polyester resins can be made from the liquid polyester resin solutions mentioned above. For example, a normally liquid polyester resin solution can be converted into solid form by the addition thereto of a chemical thickening agent such as an oxide or hydroxide of magnesium or calcium. Or the liquid polyester resin solution can be converted into solid form by adding thereto a solid filler, such as calcium carbonate, which absorbs the liquid resin. Liquid or solid amorphous polyesters which are soluble in the liquid crosslinking agent are conventionally used in this type of application. For example, a doughy mass, or other form of solid resin can be obtained by adding sufficient filler to the liquid resin as disclosed in U.S. Pat. No. 2,632,751.

These methods for converting liquid polyester resins to solid forms are not totally satisfactory for certain molding processes.

For example, the tough, rubbery sheets that are produced from a chemically thickened polyester resin cannot be satisfactorily ground into pellets or powders, a desired form of the curable resin for a molding process such as extrusion. Also, the shelf life of the chemically thickened resin sheets are limited to at most a few weeks. This is because the resin can continue to thicken, even to the extent that the viscosity of the sheet becomes so high that the resin does not flow satisfactorily in the mold under conventionally used pressures and temperatures.

A serious disadvantage in relying on the use of filler to absorb sufficient amounts of a liquid resin containing an amorphous polyester in order to provide a solid resinous composition is that the properties of the articles made from the cured composition can be affected adversely. In general, the higher the proportion of filler in the composition, the poorer the strength of articles made therefrom. Also, there is a limit as to the amount of liquid crosslinking agent or resin that can be absorbed by the filler. For applications where it is desired to use relatively high amounts of crosslinking agent, the filler can be incapable of absorbing enough of the liquid resin to convert the composition to a solid state. Speaking generally, solid polyester resins which rely on the use of filler to absorb the liquid resin contain relatively high amounts of filler and relatively low amounts of liquid crosslinking agent. The use of such compositions is limited.

Solid polyester resins can be prepared also by combining solid polyesters and solid crosslinking agents. However, there is a very limited number of satisfactory solid crosslinking agents available and they are very costly.

The present invention includes the use of a crystalline polyester in the preparation of a curable solid polyester resin. The solid resins prepared in accordance with this invention do not require the use of a chemical thickening agent or a solid crosslinking agent. Also, solid compositions containing a relatively high amount of liquid crosslinking agent and a relatively low amount of filler can be prepared in accordance with the present invention.

Ideally, solid polyester resins of the type to which this invention relates should have various properties. For example, powdered or granular forms of the composition should be non-tacky and free-flowing, even at the relatively high temperatures that are apt to be reached in hot climates. The curable solid resin should not cure prematurely, even at temperatures as high as 115°–120°F. Solid forms of the resin should be capable of being produced utilizing a wide range of amounts of crosslinking agent and filler and without necessarily sacrificing the properties of articles prepared therefrom.

Various processes have been proposed for producing curable polyester resins from crystalline polyesters or crystallizable polyesters. However, as will be seen from the discussion which follows, such processes have one or more shortcomings.

REPORTED DEVELOPMENTS

British Pat. No. 1,040,780 discloses solid curable polyester resins which include a crystalline polyester. Such resin solids are prepared by combining, at elevated temperature, a liquid crosslinking agent and a liquid polyester which is crystalline at room temperature, and then cooling to solidify the composition. The resulting solid mass can be ground into a powder which is mixed with other materials, such as filler and catalysts. Or the crystalline polyester, crosslinking agent, and other ingredients, such as filler and catalyst, can be mixed at room temperature to produce a friable dry powder. Such solid polyester resin molding compositions have various shortcomings.

Molded articles produced from compositions prepared by dry mixing the ingredients tend to have relatively low strength and poor appearance. This can be attributed to various factors. The composition tends to be heterogeneous because it is virtually impossible to obtain an intimate mix of the ingredients, and also the filler and fibrous reinforcements, if used, are not wetted with the resin. Also, glass fibers are readily abraded and broken when mixed in such a composition. The shorter the fiber length, the lower the strength of the article produced from the composition.

Compositions prepared according to the aforementioned British patent by mixing the solid crystalline polyester with the liquid crosslinking agent can be prepared in the form of dry powders only if relatively small amounts of liquid crosslinking agent are used. Cured products made from such dry powders tend to have inferior properties because sufficient crosslinking agent for reacting with all of the reactive bonds of the polyester is not available. Dry powders can be produced when larger amounts of liquid crosslinking agent are used by incorporating fillers to absorb the crosslinking agent. However, the fillers tend to reduce the strength of the cured article. Thus, the advantages attained by utilizing more crosslinking agent are offset.

U.S. Pat. No. 2,857,359 discloses the preparation of curable polyester resins which are buttery or very stiff thixotropic resins. Such resins are prepared by heating a crystalline polyester to a temperature such that it softens and liquifies to form a cloudy liquid, and thereafter mixing with said cloudy liquid an amorphous unsaturated polyester dissolved in the crosslinking agent. Alternatively, the crystalline polyester and a solvent (crosslinking agent) for the amorphous polyester are heated to form a clear solution. The solution is allowed to cool and, when the crystallization begins, the amorphous polyester, with or without the simultaneous or subsequent addition of additional solvent, is added. Such compositions are very difficult to mix with fillers and fibrous reinforcements because of their very stiff consistency. The amounts of fillers and reinforcements that can be used are limited. Long and vigorous mixing which is required, tends to break glass fibers into undesirably short lengths. Because of the extremely high viscosity of such mixes, thorough wetting of the fillers and reinforcements is difficult to achieve. Wetting by the crystalline polyester component hardly occurs because it is essentially insoluble.

U.S. Pat. No. 3,396,128 discloses that it takes a relatively long period of time to crystallize from the molten state a crystallizable polyester and crosslinking agent. (Exemplary "crystallization times" are 5 to almost 8 hours.) The crystallization time is said to be shortened, for example, to as low as 19 minutes, by adding to the polyester resin a metal salt of a higher fatty acid. When such resins are mixed with fillers and/or fibrous reinforcements, problems of the type discussed above are encountered.

Another method for preparing solid curable polyester resins consists of combining, at elevated temperature, a liquid or solid amorphous polyester which is crystallizable with a crosslinking agent, filler, and fibrous reinforcements, etc. and thereafter cooling the composition. See U.S. Pat. No. 2,632,751. This patent discloses that as the composition is cooled, the crystallizable polyester crystallizes. The use of the crystallizable polyester in this method provides a composition which has reduced tackiness. Some undesirable characteristics of this method are the required use of relatively small amounts of crosslinking agent and the mixing of the ingredients at relatively high viscosities. Problems which are encountered with methods having such undesirable characteristics are discussed above.

In view of the above, it is an object of the present invention to provide an improved process for preparing a solid curable unsaturated polyester resin. The preparation of improved unsaturated polyester resins which are curable solids is an additional object of this invention.

SUMMARY OF THE INVENTION

In accordance with this invention there is provided a process for preparing a solid curable polyester resin comprising:
A. mixing a solid crystalline polyester with a liquid crosslinking agent wherein said polyster is insoluble in said crosslinking agent at room temperature;
B. heating the mixture of said solid crystalline polyester and liquid crosslinking agent to a temperature at which said polyester dissolves in said crosslinking agent and a temperature which is below that at which the polyester and crosslinking agent cure;
C. forming a solid by cooling the heated polyester and crosslinking agent; and
D. mixing with the polyester and crosslinking agent prior to the formation of said solid one or more of a filler, fibrous reinforcements or amorphous polyester, and preferably a curing catalyst.

In preferred form, the filler, fibrous reinforcements, and/or amorphous polyester is mixed with the crystalline polyester and liquid crosslinking agent prior to heating. This results in the filler and/or fibrous reinforcements being saturated with the liquid crosslinking agent and any other liquid ingredients comprising the mix. For example, if a soluble solid or liquid amorphous polyester is used also, it will be dissolved by the liquid crosslinking agent, and the resulting solution will wet any filler and fibrous reinforcement that might be present. A number of advantages are attained by "cold mixing" the ingredients. There is little or no danger of premature gelation of the composition, even during relatively long mixing or standing times. Relatively small amounts of inhibitors can be used, and thus, shorter cure times can be realized. When the composition is mixed at room temperature as compared to elevated temperature, there is less of a tendency for protective binders which coat glass fibers to be dissolved. This aids in minimizing breakage of the fibers.

The present invention provides a number of important advantages. For the same amount of liquid crosslinking agent, the curable resins of the present invention have a greater degree of solidity or hardness than resins containing a solid or liquid amorphous polyester and no crystalline polyester. Thus, non-tacky, free-flowing curable resin powders containing higher proportions of crosslinking agent to filler can be prepared in accordance with the present invention.

The solidity of the curable resins of this invention does not depend on thickening materials such as chemical thickening agents. Compared to the other methods for preparing curable polyester resins, as discussed above, practice of the present invention affords the following advantages. Resin mixes containing crystalline polyesters, monomer, fillers and fibrous reinforcements are relatively low in viscosity and easy to mix and homogenize. Fillers and fibrous reinforcements are thoroughly wetted and impregnated with resin. This optimizes the cohesiveness of the resulting solid compositions from which cured articles with improved homogeneity and physical properties can be produced. Abrasion sensitive reinforcements such as glass fiber are lubricated during mixing and coated with resin after solidification thereof. This minimizes fiber degradation during mixing and during subsequent operations such as injection molding, thereby providing increased strength in cured, molded articles.

Other advantages include the ability to use relatively large amounts of liquid crosslinking agents such as styrene. This insures the utilization of all of the available copolymerizable unsaturation in the polyester. Furthermore, this can be done without the necessity of incorporating excessive amounts of inert fillers, which would tend to reduce the strength of the cured article. In addition, crystallization and solidification of the resin can be attained extremely rapidly and with reproducible results. A non-tacky resin can be attained immediately upon cooling. This allows the composition to be handled easily.

DETAILED DESCRIPTION OF THE INVENTION

Ingredients

Crystalline Polyester

Crystalline polyesters for use in this invention have an X-ray structure and a fairly sharp melting point. They are solids which at room temperature are insoluble or have a low solubility (for example, up to about 5 wt. %) in the crosslinking agent used in the composition, but which at elevated temperatures are readily soluble in the crosslinking agent. The crystalline polyester must be soluble in the crosslinking agent at a temperature below that at which the resin would cure.

Crystalline polyesters, which contains ethylenic unsaturation that is reactable with the ethylenic unsaturation of the crosslinking agent, and processes for preparing them are well known. For example, the crystalline polyester can be prepared by polyesterifying a symmetrical, aliphatic diol with fumaric acid, or lower alkyl esters of fumaric acid. Maleic anhydride or maleic acid or lower alkyl esters of maleic acid may also be used in the presence of a maleatefumarate isomerization catalyst such as piperidine or iodine or any of the other known isomerization catalysts. Mixtures of fumaric acid or its esters, with maleic anhydride or maleic acid or its esters, may be used provided that the amount of maleate present in the polyester is not large enough to prevent crystallization.

Part of the ethylenically unsaturated acid may be replaced wiith saturated dicarboxylic acids such as adipic, sebacic, isophthalic or terephthalic acid. This will generally have the effect of reducing the melting point of the polyester, decreasing its solution temperature and increasing its solubility. The maximum ratio of saturated acid to the ethylenically unsaturated dicarboxylic acid that can be used will be dependent on the melting point and solution temperature desired and the melting point and solubility characteristics of the polyester of the saturated acid as compared to the unsaturated polyester.

Part of the symmetrical diol may be replaced with an unsymmetrical diol such as propylene or dipropylene glycol. This will have an effect similar to, but generally more pronounced than, replacement of unsaturated with saturated dicarboxylic acids.

Specific examples of crystalline polyesters for use in the present invention include polyfumarates of: 1,6-hexanediol; neopentyl glycol; bis-(hydroxyethyl) resorcinol; ethylene glycol; 1,4-butanediol; 1,4-cyclohexanediol; or bis-(hydroxyethyl) hydroquinone.

Exemplary molecular weights and acid numbers of crystalline polyesters that can be used in the present invention are about 1000 to about 3000 and about 5 to about 40 respectively.

It is known that crystalline polyesters can differ in melting point, the degree to which they crystallize, the degree of perfection in their crystalline latices and the rate at which crystallinity develops. These differences can be attributed to the reactants used to prepare the polyesters, the molecular weight of the polyesters and what, if any, treatment the polyester is subjected to in order to accelerate crystallization. Some polyesters, for example, 1,6-hexanediol polyfurmarate, tend to crystallize rapidly and spontaneously, that is, the hot polyester reaction product cools to a crystalline solid. The use of such crystalline polyesters is highly desirable because no special procedures are needed to convert the polyester reaction product to a crystalline solid. Such procedures are required to produce some types of crystalline polyesters. For example, the cooled reaction product of neopentyl glycol and fumaric acid is not necessarily a solid crystalline product initially. It may convert to crystalline form if simply allowed to stand for a long period of time. Crystallization can be accelerated by mechanical working of the polyester, for example, cold working or shearing the polyester melt, or by annealing, or by a combination of these techniques. It is known also to accelerate crystallization by adding nucleating agents to the crystallizable polyester melt. Crystalline polyesters of the aforementioned type are referred to herein as "neat crystalline polyesters" and are the preferred crystalline polyesters for use in the invention. Other crystalline polyesters that can be used in the practice of the invention are those which are crystallized from a solvent. For example, a crystallizable polyester is combined with a solvent, solvent is evaporated and a crystalline polyester precipitates. It has been found that such "solvent-formed" crystalline polyesters, when combined with crosslinking agents, form compositions which have high viscosities compared to compositions which contain neat crystalline polyesters. Such higher viscosity compositions are more difficult to mix and do not wet solid ingredients of the composition as well as lower viscosity compositions.

It is desirable to use the crystalline polyester in the form of a relatively fine powder. This facilitates mixing of the ingredients. Also, the crystalline polyester rapidly dissolves in the crosslinking agent when heated. Thus, it is advantageous to use a crystalline polyester which can be pulverized easily. Accordingly, it is preferred that the crystalline polyester possesses a relatively high melting point and a high degree of crystallization so that it will not melt due to frictional heat during grinding and cause clogging of the grinding apparatus. The polyfumarates of 1,6-hexanediol and of neopentyl glycol can be pulverized readily into powders.

Crosslinking Agent

The crosslinking agent (also referred to herein for convenience as "monomer") is an ethylenically unsaturated liquid monomer which is capable of reacting with the ethylenically unsaturated bonds of the polyester. Vinyl monomers, preferably styrene and vinyltoluene or mixtures thereof, are suitably used. Excellent results have been attained with the use of the aforementioned preferred monomers. Vinyltoluene has the advantage over styrene of being less volatile; however, it is somewhat more costly than styrene.

The liquid monomer selected for use in a particular application should be a material in which the selected crystalline polyester is insoluble at room temperature, but which is capable of dissolving the crystalline polyester at an elevated temperature which is below that at which the resin would cure. Other characteristics which the monomer should possess include relatively low volatility and a high degree of inertness in reactions other than crosslinking.

Examples of monomers which can be used are: styrene; ring-substituted styrenes such as vinyltoluene, divinylbenzene, t-butyl styrene and chlorostyrenes; diallyl phthalate; and methyl methacrylate.

As will be discussed more fully below, the resins of the present invention can be prepared conveniently from a powdered crystalline polyester or other small particle size form of the polyester. A mixture of the powdered crystalline polyester and liquid monomer will generally comprise a 2 phase composition in which the powdered crystalline polyester is dispersed in the liquid monomer. In general, mixing will be required to maintain the small solid particles of crystalline polyester dispersed in the liquid monomer. When the 2 phase composition is heated to a sufficiently high temperature, the crystalline polyester dissolves in the liquid monomer to form a clear solution. Upon cooling, the liquid solution solidifies into a solid solution of the crystalline polyester and monomer. (The crystalline polyester does not separate from the crosslinking agent as the liquid solution cools and converts to a solid.) The time of the heating/cooling cycle for converting laboratory samples of the solid crystalline polyester/liquid monomer mix into a solid solution can be very short, for example, about 0.1 to about 10 minutes. The rate at which the temperature of a crystalline polyester/liquid monomer mix can be reduced to the point at which solidification takes place will be dependent upon the rate at which heat can be removed from the mix. This in turn will depend upon the removal conductivity and heat capacity of the system as a whole, the temperature gradient, the amount of polyester mix present, the geometry of the vessel and the amount of mixing.

Crystalline polyester-monomer systems have been observed to vary in the rate at which solidification occurs, depending upon which crystalline polyester is used. For example, the polyfumarates of 1,6-hexanediol and neopentyl glycol have been found to yield polyester-monomer solutions which solidify very rapidly and are therefore among those which are preferred, particularly for use in continuous processes.

Curable solid resin solutions, as described above, can vary in hardness from soft, non-flowable pastes to very hard, brittle solids. The hardness depends on the amount of liquid crosslinking agent used and the specific crosslinking agent used. The lower the amount of crosslinking agent, the harder will be the resin. Speaking generally, a composition containing only the crystalline polyester and liquid crosslinking agent can be made in a paste-like form which is non-flowable under its own weight when the amount of crosslinking agent is the range of about 70 wt. %. (As larger amounts of crosslinking agent are used, the composition tends to become softer and less homogeneous and distinct solid and liquid phases are attained.) Hard, brittle compositions can be attained when the amount of crosslinking agent is about 40 wt. % or less. Compositions containing about 40 wt. % tend to be waxy in nature, and as the concentration of this ingredient is increased toward 70 wt. %, the composition becomes more paste-like. As will be discussed fully below, the hardness of a composition depends on the particular crystalline polyester used and can be varied by incorporating therein materials such as fillers, fibrous reinforcements, amorphous polyesters and other materials.

The solidification phenomenon of the liquid resin and the mechanicm by which the liquid crosslinking agent is held within the solid resin is not known. The hard brittle and wax-like solid resins appear to the naked eye and when viewed under high magnification to consist of a single phase. The softer paste-like compositions which contain higher concentrations of crosslinking agent show evidence of surface wetness when viewed under high magnification. The term "solid solution" is used herein to describe such compositions; it does not necessarily mean that the solid resins are completely homogeneous on a molecular scale or that the structures thereof would fully meet all the scientific criteria for true solutions.

Amorphous Polyester

Amorphous polyesters, which are optional, but preferred ingredients, exist in liquid or solid forms at room temperature. The solid forms do not have an X-ray pattern and soften over a relatively wide temperature range. Thus, they do not have a sharp melting point.

Use of an amorphous polyester in the curable composition has various advantages. A portion of the more expensive crystalline polyester can be replaced by the less expensive amophous polyester without sacrificing properties such as the strength and rigidity of cured articles. The use of the amorphous polyester improves the cohesiveness of the composition and reduces the rate of evaporation of volatile monomers from pellet, granular or other small particle forms of the solid resin. The physical and chemical properties of molded articles can be adjusted by including in the resin selective amorphous polyesters. For example, the use of halogenated amorphous polyesters will increase the resistance to burning of the cured article.

Any of the many available types of solid or liquid amorphous polyesters can be used. The amorphous polyester should be soluble in the monomer and not form a distinct separate phase during the cooling cycle. The choice of the particular amorphous polyester will depend on the types of properties desired in the cured product and can be made on the basis of the knowledge of the art. Exemplary molecular weights and acid number of amorphous polyesters that can be used are about 1000 to about 3000 and about 5 to about 40 respectively. Examples of amorphous polyesters, which contain ethylenic unsaturation, are: the products obtained by polyesterification of one or more diols such as, for example, propylene glycol, dipropylene glycol, ethylene glycol or diethylene glycol, with a substantially equimolar amount of an ethylenically unsaturated dicarboxylic acid or anhydride thereof, for example, maleic anhydride or maleic acid or a mixture of maleic anhydride or maleic acid and optionally with a saturated dicarboxylic acid or anhydride such as isophthalic acid, phthalic anhydride, tetrachlorophthalic anhydride or tetrabromophthalic anhydride.

As mentioned above, the heating/cooling cycle employed in the practice of this invention converts a solid crystalline polyester/liquid monomer mix into a solid solution of the ingredients. As this 2 phase mix is heated, it increases in viscosity as the crystalline polyester dissolves in the monomer. As the liquid solution of polyester and monomer is cooled, the liquid composition continues to increase in viscosity and ultimately reaches a solid state. The substitution of a liquid or solid non-crystallizable amorphous polyester for the crystalline polyester gives an entirely different result. For example, upon heating a non-crystallizable amorphous polyester with a liquid monomer, a solution which decreases in viscosity is formed. As the solution is cooled, it increases in viscosity and returns to its original state. It does not solidify into a solid solution, even if the non-crystallizable amorphous polyester used is a solid.

Fillers

Fillers are added to the resinous composition as extenders and to impart such properties as reduction in shrinkage and tendency to crack during cure. Fillers also tend to give improved stiffness and heat resistance in molded articles. Some fillers also tend to improve the strength properties of the cured article, but to a lesser extent than fibrous reinforcements. Fillers which are capable of absorbing the liquid monomer or liquid resin will also have an effect on the solidity of the composition as will be described more fully below. Examples of fillers that can be used are calcium carbonate, clays, hydrated alumina, calcium silicate and talcs, silica, mica and microspheres made from glass and other materials.

The principal consideration in selecting the filler, and the amount thereof, may in some cases be cost. In other cases, it may be the effect of the filler on mix viscosity or flow properties during extrusion or molding. In still other cases, it may be the effect that the filler has on properties such as shrinkage, surface smoothness, chemical resistance, flammability or electrical characteristics of the cured molded article.

Fillers may be selected also on the basis of their influence on the strength of cured articles. In general, fillers having high tensile strength and consisting of acicular (fibrous or needle-like shape) or plate-like particles will have some degree of reinforcing quality relative to spherical particles or those with non-descript, massive shapes. Particularly useful are acicular or platelet fillers having a high aspect ratio, that is, those having one or more dimensions much larger than another. Examples of reinforcing fillers are potassium titanate whiskers, Wollastonite, mica and fibrous talcs.

Several other factors may also be taken into account in determining the amount of filler to use. In general, the larger the amount of filler used in the composition, the harder the composition. For example, the larger the amount of filler incorporated in a composition which contains a relatively large amount of liquid monomer and/or an amorphous polyester, and which is thus normally soft or pasty, the harder the composition. Thus, the amount of filler used may depend on whether a relatively soft or a very hard or crumbly composition is desired. In general, one should not use a substantially greater quantity of filler than is required to absorb that amount of monomer which is in excess of that incorporated in the crystalline polyester solid solution, together with other liquid ingredients that may be present. The use of excessive amounts of filler will tend to yield cured articles with inferior strength, as experienced in prior art methods, and thereby negate the special advantages inherent in the present invention. Excessive amounts of filler may also tend to deplete the supply of monomer needed for formation of the desired crystalline polyester solid solution. In extreme cases, insufficient liquid may be present to fully wet the filler itself. The resulting composition will tend to be non-homogeneous and will tend to be dusty and lacking in cohesiveness. The amount of filler required to achieve any given consistency will in large part be determined by its efficiency in absorbing liquid.

The absorptivity of fillers tends to vary widely. In any case, the amount of filler required to produce a composition of a given hardness will be substantially less in the practice of the present invention as compared to the practice of heretofore known processes which employ only amorphous polyesters or crystalline polyesters which have not been converted to solid solutions according to the present invention.

Fibrous Reinforcements

Fibrous reinforcements are added to the resinous composition for the purpose of imparting strength to the cured product formed therefrom. Fibrous reinforcements which are capable of absorbing the liquid monomer or liquid resin will also have an effect on the solidity of the composition as will be described more fully below. Examples of fibrous reinforcements that can be used are glass fibers, asbestos, synthetic organic fibers such as acrylonitrile, nylon and linear polyester fibers and natural organic fibers such as cotton and sisal. Non-fibrous reinforcements can also be incorporated to increase the strength and rigidity of cured articles, although the reinforcing efficiency of non-fibrous materials is usually less. Examples of this type of reinforcing additive are materials having high tensile strengths and moduli combined with a large ratio of length or diameter to thickness, such as thin flakes of glass or mica.

The preferred fibrous reinforcements are glass fibers. Glass fiber reinforcements in various of their available forms can be used, including for example, mats of chopped or continuous strands of glass, glass fabrics, chopped glass rovings and chopped glass strands.

Other Ingredients

Other materials which are generally incorporated into polymerizable unsaturated polyester resin formulations to obtain special effects may also be used in the compositions included within the scope of this invention. Thus, initiators or catalysts, crosslinking and stabilizing inhibitors, accelerators or promoters, pigments and mold release additives, etc. can also be incorporated in the composition in amounts which are known to be functional. Examples of initiators or catalysts that can be used are t-butyl perbenzoate, t-butyl hydroperoxide, succinic acid peroxide, cumene hydroperoxide and dibenzoyl peroxide. Examples of crosslinking and stabilizing inhibitors that can be used are hydroquinone, mono-t-butylhydroquinone, di-t-amylhydroquinone, benzoquinone and t-butylcatechol. Examples of accelerators or promoters which can be used are cobalt naphthenate, diethylaniline and dimethylaniline. Examples of pigments that can be utilized are iron oxides, titanium dioxide and phthalocyanines.

Polymeric materials which reduce the shrinkage of polyester resin formulations as they are cured can be used also in the practice of the present invention. As is known, such anti-shrink materials are effective in producing articles having surfaces of improved smoothness. Examples of thermoplastic polymers that can be used are homopolymers of: ethylene; styrene; vinyl toluene; alkyl methacrylates; and alkyl acrylates. Additional examples of thermoplastic polymers are copolymers of: vinyl chloride and vinyl acetate; styrene and acrylonitrile; methyl methacrylate and alkyl esters of acrylic acid; methyl methacrylate and styrene; and methyl methacrylate and acrylamide. Thermoplastic polymers which contain about 0.1 to about 5 wt. % of acid functionality in forms such as carboxyl groups, sulfonic acid groups, phosphonic acid groups, phosphoric acid groups, etc. can be used also. The acid functional groups in the thermoplastic can be incorporated into the polymer during the formation thereof or by preparing the polymer from a monomer that contains acid functionality. Examples of such acid functional polymers include copolymers prepared by reacting monomers such as itaconic acid, maleic acid, acrylic acid, methacrylic acid, p-vinylbenzoic acid and vinyl sulfonic acid with reactive ethylenically unsaturated monomers such as styrene, alkyl acrylates, alkyl methacrylates, acrylonitrile and a mixture of vinyl chloride and vinyl acetate. The aforementioned examples are illustrative; other thermoplastic polymers, including styrene-maleic anhydride copolymer, can be used also.

The curable solid resins of the present invention can be made in forms which vary in hardness from non-flowable, soft pastes, (for example, like pastry dough or putty) to hard brittle masses (for example, like blackboard chalk or plaster of Paris).

The solid form of the composition will depend on a number of different factors such as the specific crystalline polyester used, the proportion of liquid monomer, the presence and amounts of materials such as fillers, fibrous reinforcements, amorphous polyesters and thermoplastic polymers. As mentioned above, the use of relatively high amounts of liquid monomer, for example about 60 to about 80 wt. %, with the crystalline polyester produces a soft paste-like material. This soft paste material can be converted to a thicker paste and eventually to a hard brittle mass by adding to the composition materials which absorb the liquid monomer and liquid resin. Certain types of fillers and fibrous reinforcements will accomplish this, as will be seen from the examples which follow. On the other hand, the use of a liquid or solid amorphous polyester tends to make the solidified composition much softer than it would be if the crystalline polyester were the only polyester present.

As will be seen from the examples, the solid curable resin can be prepared in many different forms such as non-tacky, free-flowing powders, granules or pellets, non-tacky sheets, pastes of varying hardness and stiff doughs. The amounts of ingredients used in preparing such solid resins can vary over a relatively wide range. For example, the resin composition can comprise, based on the total weight of the composition excluding fibrous reinforcement: (a) about 2 to about 70 wt. % of crystalline polyester; (b) about 6 to about 80 wt. % of monomer; (c) 0 to about 75 wt. % of filler; (d) 0 to about 30 wt. % of amorphous polyester; and (e) 0 to about 20 wt. % of anti-shrink polymer. Preferably, the weight ratio of polyester (crystalline polyester plus amorphous polyester, if any) to monomer should not exceed 3 to 1 and most preferably should not exceed 1.5 to 1. The relative amounts of ingredients are, of course, interrelated. For example, the greater the proportion of filler that is used, the less the proportion of crystalline polyester required. The greater the amount of filler employed, the greater is the amount of monomer and/or amorphous polyester that can be used.

The amount of fibrous reinforcement can comprise from 0 to about 60 wt. %, based on the total weight of the composition. Because fibrous reinforcements act to some extent as a filler, the amount of filler can be reduced somewhat as the reinforcement content is increased.

Ingredients such as lubricants, catalysts and inhibitors are normally present in such small amounts, generally less than 2 wt. %, that they have an insignificant effect on the amounts of the major ingredients.

It should be understood that the specific amounts of ingredients used will depend on the form of composition desired and the specific ingredients comprising the composition. Adjustments in the amounts of ingredients should be made on the basis of experience.

It is believed that the present invention will be used widely in preparing non-tacky, free-flowing powders, granules, or pellets which contain a relatively high proprotion of monomer. Such compositions will generally comprise, (a) about 3 to about 25 wt. % crystalline polyester; (b) about 10 to about 50 wt. % of monomer; (c) about 30 to about 75 wt. % of filler and about 2 to about 12 wt. % of a polymeric anti-shrink additive. In addition, about 10 to about 50 wt. % of fibrous reinforcements, based on the total weight of the composition should be used.

Preparation of Curable Solid Polyester Resins

In preferred form, the composition is prepared by mixing all of the ingredients prior to heating to distribute them uniformly throughout the composition. In following this technique, the ingredients can be mixed more readily because the viscosity of the mix is relatively low at this stage of the preparation process. Also, all of the solid ingredients are wetted with the liquid ingredients. The composition is then heated, preferably as mixing is continued, to a temperature at least sufficiently high for the crystalline polyester to be dissolved by the liquid monomer. (This temperature can be determined readily by heating a mix containing the crystalline polyester and liquid monomer only and observing the temperature at which a clear liquid solution is formed. The "solution temperature" will vary depending on the particular polyester and monomer used and the amounts thereof. In general, it will be below about 100°C.) The ingredients can be heated to a higher temperature, but care should be taken to avoid heating to a temperature at which the resin cures. After the ingredients have been so heated, the elevated temperature can be maintained for a few minutes or heating can be terminated promptly and the mix allowed to cool. With some compositions it has been observed that the rate at which the composition is cooled has a bearing on the hardness of the product. The faster the rate of cooling, the harder the resulting product. However, with the other compositions, this relationship has not been observed.

The solid resinous composition can be prepared in a relatively short time, for example, about 0.1 to about 45 minutes. The ingredients can be mixed and heated for about 3 seconds to about 15 minutes, maintained at an elevated temperature for about 1 second to about 5 minutes, and then cooled to room temperature within about 3 seconds to about 25 minutes. It should be understood that the required to reach the desired elevated temperature, and thereafter to cool to room temperature, will depend upon the mass of material being heated and several other factors. The time required for maintaining the composition at the elevated temperature will depend on the rate at which the crytalline polyester dissolves, which in turn is determined by a number of principles, such as particle size and degree of mixing, if any. Rate of solution can be accelerated by heating to a temperature which is higher han the solution temperature, as defined above. If the mixture of ingredients is heated to a temperature which is somewhat below the solution temperature, solidification will be incomplete; all of the crystalline polyester will not be incorporated in solid solution and the cooled product will be softer than otherwise would be the case. In general, whether a long time is required to cool the composition, or a very short time, solidification occurs very rapidly, immediately, or at most within a few minutes after room temperature has been reached. In many cases solidification is substantially completed at a temperature well above room temperature, for example at about 45°C.

To facilitate preparation of the composition, the crystalline polyester should be of relatively small particle size, for example, about 0.065 inch or less, and preferably not larger than about 0.01 inch. In general, the smaller the particle size, the faster the rate of solution of the crystalline polyester in the hot monomer. Solution may be accomplished with or without mixing. It is particularly desirably to utilize a very fine powder when mixing is not employed during heating. It is also desirable to use a crystalline polyester in very small particle size to reduce the rate of settling in those cases where mixes must be allowed to stand for long periods before solidifying.

When preparing the solid resin according to the preferred method described herein, ingredients of the mix are wetted initially with just the liquid monomer. They may be wetted also with a solution of the liquid monomer and soluble ingredients such as an amorphous polyester or anti-shrink thermoplastic polymer when used. However, the ingredients are not wetted initially with the crystalline polyester because it is insoluble. However, as the temperature of the mix is raised and the monomer dissolves the crystalline polyester, the other ingredients are wetted wtih the resulting resin solution. The overall effect of this is to achieve very rapid and thorough impregnation, that is, wetting of the surface, of fillers and/or reinforcements. Since only liquid monomer, or a relatively dilute solution of amorphous polyester and/or anti-shrink polymer in monomer, is initially present in the liquid phase of the cold mix, the viscosity of the liquid phase is very low compared to resins in which all of the polyester is initially dissolved in monomer. This low viscosity greatly facilitates impregnation into small recesses of filler particles and bundles of fibrous reinforcements.

Thorough impregnation is important because it assures good bonding between resin matrix, fillers and reinforcements in the cured articles and provides better homogeneity and strength. Thorough impregnation also improves the strength, uniformity and cohesiveness of the solid resin composition in the uncured state. This is of special importance in the case of solid resins in the form of pellets for injection molding applications. Such pellets must possess considerable strength and cohesiveness in order to maintain their integrity during the impacts and vibrations encountered during conveying and container filling operations and during shipping.

Other mixing/heating sequences may be used to prepare the solid curable resins. However, if the fillers and/or reinforcements are not added to the heated crystalline polyester/monomer composition before it solidifies, the desired uniformity of mix and wetting of the solid surfaces are not attained. Ingredients such as fillers, amorphous polyesters and fibrous reinforcements can be added to the crystalline polyester/monomer composition while it is being heated or cooled. However, in these cases the composition will tend to have a higher viscosity than if the ingredients are all cold blended, and accordingly, will be more difficult to mix.

A variety of techniques can be used to prepare various forms of the curable solid resin. For example, the heated resinous composition can be formed into non-tacky sheets by pouring the hot composition into trays. Sheets ranging in hardness from soft doughs to very hard brittle compositions can be cured and molded by compressing in a heated mold. Or such sheets can be ground into powder or granules which can be molded by compression, transfer, injection or rotational molding techniques. The ingredients of the composition can be mixed in a screw extruder and extruded into curable pellets, for example, in the manner described in Example 59 below. Such curable pellets can be molded and cured into articles such as appliance housings and electrical equipment components by injection or transfer or compression molding. A curable rod having longitudinal parallel fibers can be prepared also. This can be accomplished by passing roving through a bath of the resin mix. The roving impregnated with resin mix can then be drawn through a die heated to the temperature at which the crystalline polyester dissolves in the cross-linking agent. Thereafter, the impregnated roving solidifies into a curable rod or bundle of coated strands as it is cooled, and can be cut into any desired length to produce pellets, elongated pellets or resin impregnated strands.

Such pellets or strands can be molded and cured by plastication and injection into a hot mold cavity. Molding and curing pressures and temperatures which are used with other types of curable polyester resin compositions can be used to mold and cure the solid resins of the present invention. Exemplary molding and curing conditions are as follows: pressures of about 200–2000 psi and temperatures of about 250°–350°F.

EXAMPLES

Examples which follow illustrate various aspects of the present invention. The terms listed below have the meanings indicated:
 "parts" refers to parts by weight;
 "phr" refers to parts by weight per 100 parts of the mixture described.
 "percent by weight" refers to percent by weight based on the total weight of all of the ingredients comprising the composition.

The first group of examples is illustrative of the preparation of solid curable compositions utilizing different crystalline polyesters and different monomers in varying proportions. The compositions were prepared by mixing a crystalline polyester in solid form with a liquid monomer, heating the same to dissolve the solid polyester and then cooling the liquid solution to form therefrom a curable solid.

The solubility of crystalline polyesters in commonly used liquid monomers such as styrene is neglegible at room or moderately elevated temperatures. A powdered crystalline polyester and a liquid monomer is typically a readily flowing slurry. When such a slurry is heated to a sufficiently high temperature, the polyester dissolves in the monomer and a homogeneous liquid composition is formed. The temperature at which this occurs is referred to herein as the solution temperature as mentioned above. The solution temperature is well below the temperature at which crosslinking occurs and can vary depending on the particular polyester and monomer used and the proportion thereof. In general, the higher the proportion of monomer, the lower the solution temperature.

To illustrate, there is set forth in Table 1 below the solution temperatures of various polyester/monomer compositions.

Table 1

| Ex. No. | Polyester | Resin Monomer | Solution Temp., °C |
|---|---|---|---|
| 1 | 80% A | 20% styrene | 91 |
| 2 | 70% " | 30% " | 84 |
| 3 | 60% " | 40% " | 69 |
| 4 | 50% " | 50% " | 63 |
| 5 | 40% " | 60% " | 58 |
| 6 | 70% " | 30% vinyltoluene | 82 |
| 7 | 50% " | 50% " | 69 |
| 8 | 40% " | 60% " | 65 |
| 9 | 70% " | 30% chlorostyrene | 85 |
| 10 | 70% " | 30% t-butyl styrene | 91 |
| 11 | 60% B** | 40% styrene | 80 |
| 12 | 70% " | 30% vinyltoluene | 84 |
| 13 | 70% " | 30% chlorostyrene | 85 |
| 14 | 70% " | 30% t-butyl styrene | 89 |

*crystalline polyester prepared by reacting 1.04 moles of 1,6-hexanediol and 1.0 mole of fumaric acid to a molecular weight of 2230, an acid no. of 14 and melting point of 120°C.
**crystalline polyester prepared by reacting 1.03 moles of neopentyl glycol and 1.0 mole of fumaric acid to a molecular weight of 1370, an acid no. of 17 and crystallizing in an oven at 90°C.

As the polyester/monomer solution is cooled, it solidifies rapidly when it reaches a temperature below the solution temperature. Thus, the polyester/monomer slurry is transformed to a homogeneous solid. By subjecting the insoluble polyester/monomer slurry to the heating/cooling cycle described, the slurry is converted to a solid resin solution, the hardness of which depends on the particular polyester and monomer used and the proportion or ratio of each. At moderate crystalline polyester/monomer ratios (for example, about 1:1 to about 1.5:1), the solid resin after cooling to room temperature is relatively soft and waxy; at higher ratios (for example, about 2:1 to about 3:1), it is relatively hard and similar to a hard parafin wax. At low crystalline polyester/monomer ratios (for example, about 0.4:1 to about 0.7:1), the cooled solid resin is extremely soft and pasty at room temperature.

To illustrate, there is set forth in Table 2 below a description of the physical state of various resin compositions which contain different amounts of crystalline polyester and monomer. The crystalline polyesters used in the compositions described in Table 2 were the same as those used in the compositions described in Table 1 above.

Table 2

| Ex. No. | Polyester | Resin Monomer | Physical State at Room Temp. |
|---|---|---|---|
| 15 | 70% A* | 30% styrene | hard solid |
| 16 | 60% " | 40% " | waxy solid |
| 17 | 50% " | 50% " | soft waxy solid |
| 18 | 40% " | 60% " | waxy paste |
| 19 | 70% " | 30% vinyl toluene | hard solid |

Table 2-continued

| Ex. No. | Polyester | Resin Monomer | Physical State at Room Temp. |
|---|---|---|---|
| 20 | 60% " | 40% " | waxy solid |
| 21 | 50% " | 50% " | stiff paste |
| 22 | 70% B** | 30% styrene | hard solid |
| 23 | 60% " | 40% " | hard solid |
| 24 | 50% " | 50% " | waxy solid |
| 25 | 40% " | 60% " | soft waxy solid |
| 26 | 30% " | 70% " | waxy paste |

*See Table 1 above
**See Table 1 above

The preparation of a resin which is harder than that of the pasty resins of Examples 18 and 26 of Table 2 above and which contains a relatively high ratio of monomer to crystalline polyester can be accomplished by incorporating in the composition a sufficient amount of a material which will take up the liquid monomer. Fibrous reinforcements such as glass fibers will accomplish this. However, finely divided materials are more effective. Examples of such materials are mineral fillers such as calcium carbonate, clays and talcs. The examples in Table 3 below are illustrative. The compositions of these examples were prepared from a watery, rapidly settling slurry of 1,6-hexanediol polyfumarate powder (having an acid no. of 14, a molecular weight of 2230 and melting point of about 120°C) and styrene, in a 40:60 ratio by weight. There were added to different samples of the slurry the amounts of powdered calcium carbonate filler shown in Table 3. Each composition was then heated above its solution temperature and thereafter cooled to room temperature. The forms of the solid resins are described in Table 3. For comparative purposes, there is shown also in Table 3 the results that were attained when an amorphous polyester was substituted for the crystalline polyester. The amorphous polyester was prepared by reacting dipropylene glycol and maleic anhydride to an acid number of 10 and a viscosity of 25 poise, measured at 71% solids in vinyltoluene.

Table 3

| Filler, wt. % | Physical State of Resin after Heating and Cooling | |
|---|---|---|
| | Crystalline polyester | Amorphous polyester |
| 10 | thin paste | |
| 20 | soft paste | |
| 30 | heavy paste | |
| 40 | stiff putty | very thin liquid |
| 50 | brittle solid | thin liquid |
| 60 | | liquid |
| 70 | | thin paste |
| 80 | | soft paste |
| 85 | | crumbly solid |

From Table 3 above, it can be seen that as higher amounts of filler were used, harder resins were attained. The brittle, solid resin containing 50 wt. % filler was a dry, crumbly solid which was easily converted to a free-flowing, non-tacky particulate form. On the other hand, a crumbly solid form of resin containing the amorphous polyester was attained with a very high filler amount, that is 85 wt. %. A disadvantage of this type of composition compared to the resin containing the crystalline polyester and 50 wt. % filler is that it becomes tacky upon slight warming, and even without warming, the particles tend to gradually flow together to form a lumpy mass.

The next group of examples shows the solution temperatures of compositions containing an amorphous polyester in addition to a crystalline polyester. The crystalline polyester was the 1,6-hexanediol polyfumarate used in Example 1 above. The monomer and amorphous polyester used in the compositions are set forth in Table 4 below. Each composition comprised the amount of monomer indicated in the table; the balance of the composition comprised the crystalline/amorphous polyesters in a 2:1 weight ratio. The compositions were prepared by heating the mixtures of polyesters and monomer to the solution temperature, then cooling to room temperature.

Table 5

| Ex. No. | Filler | % Filler | Physical State of Resin after Heating and Cooling |
|---|---|---|---|
| 30 | CaCO₃ | 10 | Thin Paste |
| 31 | " | 20 | Very Soft Paste |
| 32 | " | 30 | Soft Paste |
| 33 | " | 40 | Soft Putty |
| 34 | " | 50 | Crumbly Solid |
| 35 | Clay* | 20 | Heavy Paste |
| 36 | " | 30 | Putty |
| 37 | " | 40 | Crumbly Solid |

*ASP-400, a fine, powdered aluminum silicate clay.

With reference to Table 5 above, the "crumbly solid"

Table 4

| | | | | Solution Temp. in °C. for: | | | |
| Amorphous Polyester (a) | Styrene 30% | Styrene 50% | Styrene 60% | Vinyltoluene 30% | Vinyltoluene 50% | Chlorostyrene 30% | t-Butyl Styrene 30% |
|---|---|---|---|---|---|---|---|
| 3/1/2 PG/MA/PA | 73 | 57 | 53 | 74 | — | 72 | 77 |
| 2/1/1 EG/MA/TCPA | 75 | 57 | 40 | — | — | — | — |
| 1/1 PG/MA | 65 | 59 | 42 | 73 | 67 | 75 | 79 |
| 2/1/1 PG/MA/IPA | 75 | 56 | 50 | — | — | — | — |
| 1/1 DPG/MA | 75 | 62 | 51 | — | — | — | — |

(a) Polyesters prepared using the given molar ratios of ingredients, abbreviated as follows: PG = propylene glycol; MA = maleic anhydride; PA = phthalic anhydride; EG = ethylene glycol; TCPA = tetrachlorophthalic anhydride; IPA = isophthalic acid; DPG = dipropylene glycol.

The resin compositions of Table 4 above, upon being cooled to room temperature, were solids ranging in form from soft pastes to waxy solids.

The next group of examples show various resins containing both an amorphous and a crystalline polyester.

EXAMPLE 27

Seven parts of a mixture consisting of a 2:1 ratio of neopentyl glycol polyfumarate (as described in Example 11 above) and a polyester prepared from equimolar proportions of propylene glycol and maleic anhydride were slurried with 3.0 parts of styrene monomer. The slurry was heated on a steam bath for a few minutes and at a temperature of about 75°C a clear solution formed. The solution was allowed to cool to room temperature. The solidified resin, which formed immediately was a waxy solid.

EXAMPLE 28

The procedure of Example 27 was repeated except that 6 parts of the polyester mixture was combined with 4 parts of styrene. Upon cooling, a heavy paste was obtained.

EXAMPLE 29

The procedure of Example 27 was repeated except that 5 parts of the polyester mixture was combined with 5 parts of styrene. Upon cooling, a thin paste was attained.

The next group of examples show the preparation of resins with and without filler and the effect that varying amounts of the filler has on the hardness of the resins.

A slurry consisting of 26.7 parts of powdered 1,6-hexanediol fumaric acid polyester as described in Example 1 above, 13.3 parts of dipropylene glycol-maleic anhydride polyester and 60 parts of styrene was heated for several minutes on a steam bath until a clear solution was attained. The solution was allowed to cool to about 23°C over a 5 minute period. The resulting resin was a thin paste. The same procedure was repeated, but with powdered calcium carbonate filler or clay added to the initial slurry in the amounts indicated in Table 5 below.

was a dry, non-tacky solid which was easily comminuted.

The next group of examples shows the molding and curing of articles from filled powdered compositions containing a thermoplastic polymer which functions to reduce the shrinkage age of the composition. The crystalline 1,6-hexanediol polyfumarate used in the examples was the same as the crystalline polyester used in Example 1.

EXAMPLE 38

A mixture consisting of 1,6-hexanediol polyfumarate powder (20 parts), dipropylene glycol-maleic anhydride polyester (10 parts), vinyl toluene (55 parts), t-butyl perbenzoate (1.0 part), mono-t-butyl-hydroquinone (0.02 part), benzoquinone (0.015 part) and Camel Wite calcium carbonate (233 parts) was blended using a high speed stirrer. The pasty mix was heated to 75°C over about a 10 minute period while mixing in a jacketed, double arm mixer, then cooled over a 20 minute period while mixing was continued. The resulting lumpy solid composition was reduced to a coarse powder by grinding in an ice-chopper, then mixed in a twin shell dry blender with 4.5 phr of polyethylene powder, 1.0 phr of zinc stearate and 15% by weight of ¼-in. chopped fiber glass strands. The resulting, free-flowing dry mix was molded at 300°F for 2 min. under 300 psi of pressure, yielding cured sheets with linear shrinkage of about 0.0005 in/in and having a very smooth, glossy surface. Molded parts containing large bosses and deep ribs showed no visible sink marks.

EXAMPLE 39

A pasty mix having the same composition as given in Example 38 was agitated in a 1-gallon container and heated to 75°-80°C on a steam bath for about 3 minutes. The hot mixture was poured into shallow trays and allowed to cool over about a 5 minute period. Sheets of a brittle solid about ¼-in. thick were obtained. The sheets were crushed and mixed at 25°C with 4.5 phr of polyethylene powder and 1 phr of zinc stearate in a Baker-Perkins sigma blade mixer. The chunks which were obtained were comminuted in a high speed chopper yielding a coarse granular powder. The granular powder was blended in a ribbon dry blender with 2.0 phr of Satintone-4, a high oil absorption calcined clay, containing 1 wt. % of fumed silica anti-caking agent 15 wt. % of ¼-in., chopped strand fiber glass. Curing of the resulting dry mixture by compression molding at 300°F produced articles with surface and shrinkage properties similar to those of the articles of Example 38. Excellent moldings were obtained also when the composition was enriched with additional fiber glass so that the total glass content was 30% by weight. The composition was also molded and cured into tensile test bars by injection molding in a 175-ton, in line screw injection molding machine using an injection pressure of 1500 psi and mold temperatures of 300°-325°F.

EXAMPLE 40

The procedure of Example 39 was repeated except that the powdered polyethylene was blended with the other ingredients before heating and solidifying in a tray. The product was essentially the same except somewhat larger in particle size.

EXAMPLE 41

A liquid resin mix was prepared by blending in a high speed mixer: 1,6-hexanediol polyfumarate (20 parts), dipropylene glycol polymaleate (10 parts) vinyl toluene (55 parts), polyethylene powder (15 parts), t-butylperbenzoate (1.0 part), mono-t-butylhydroquinone (0.02 part), benzoquinone (0.015 part), zinc stearate (2.0 parts) and powdered calcium carbonate (233 parts). The mix was poured into a 8 × 5 × 0.5 mold and heated for 2 min. in a press with platens at 100°C. The platens were then rapidly cooled. When cooled to room temperature within 5 minutes, the solid, uncured slab was removed from the mold, broken into chunks and comminuted in a Patterson-Kelley twin shell blender. Mixing was continued while zinc stearate (0.6 phr) and calcined clay (0.7 phr) were added. The resulting product was a dry, free-flowing, fine granular curable solid. It was moldable in this form or could be first dry blended with various amounts of fiber glass.

EXAMPLES 42 to 55

Different molding compositions, as identified in Table 6 below were prepared by the following general procedure: A liquid resin-filler mix was first prepared by agitating thoroughly, for 2 min., in a Cowles Dissolver without application of heat, crystalline polyester powder, amorphous polyester predissolved in monomer, additional monomer, free-radical producing catalyst, inhibitor, internal lubricant and a thermoplastic polymer. The liquid mixture, while at room temperature, was blended with chopped fiber glass strands for 1-5 minutes in a sigma blade mixer, then transferred to a ¼-½ in. deep mold and heated between the platens of a press to an internal material temperature of about 70°-80°C in 1-3 min. while compacting with sufficient pressure to expel excess trapped air. Upon cooling over a 5 min. period, the composition solidified to a non-tacky state. A non-tacky state was usually reached when the temperature dropped to about 50°-55°C. This composition in sheet form was removed from the mold. The hardness of the compositions varied ranging from soft and easily deformable to very stiff and hard. The chief determinants of hardness were the ratio of crystalline to amorphous polyester and the monomer content. The hardness of some of the compositions was measured as indicated in Table 6 below. This was done with a Precision Scientific Co. penetrameter by measuring the depth of penetration of a needle loaded with a 50 g wt. and dropped from a height of 1.5 in.

Table 6

| Example Number | Cryst. Polyester Type | %[c] | Amorphous Polyester Type | %[c] | Monomer Type | %[c] | Thermo-Plastic Type | %[c] | Filler %[h] | Glass %[i] | Physical State | Penetration, mm | Shrinkage[j] |
|---|---|---|---|---|---|---|---|---|---|---|---|---|---|
| 42 | NPG[a] | 30 | PG[d] | 10 | styrene | 50 | PE[f] | 10 | 55 | 20 | Very hard | — | 2.3 |
| 43 | NPG | 30 | PG | 10 | " | 45 | PE | 15 | 50 | 15 | " | — | 2.9 |
| 44 | NPG | 30 | PG | 10 | " | 45 | PE | 15 | 50 | 25 | " | — | 1.4 |
| 45 | NPG | 20 | PG | 15 | " | 50 | PE | 15 | 60 | 15 | Hard | — | 1.8 |
| 46 | HD[b] | 30 | DPG[e] | 10 | " | 45 | PE | 15 | 50 | 15 | Very hard | — | 2.6 |
| 47 | HD | 30 | DPG | 10 | vinyl-toluene | 45 | PE | 15 | 62 | 15 | " | — | 2.4 |
| 48 | HD | 35 | DPG | 10 | " | 45 | PE | 15 | 62 | 15 | " | — | 2.6 |
| 49 | HD | 20 | DPG | 10 | " | 55 | PE | 15 | 73 | 15 | Hard | — | 0.15 |
| 50 | HD | 20 | DPG | 10 | " | 60 | PE | 10 | 70 | 15 | " | 2.7 | 0.9 |
| 51 | HD | 20 | DPG | 10 | " | 65 | PE | 5 | 70 | 15 | Flexible | 5.7 | 1.9 |
| 52 | HD | 20 | DPG | 10 | " | 55 | LPS-40[g] | 15 | 70 | 15 | Hard | 2.6 | 0.9 |
| 53 | HD | 20 | DPG | 10 | " | 65 | LPS-40 | 5 | 70 | 15 | Soft, flexible | 6.9 | 3.0 |
| 54 | HD | 25 | DPG | 15 | " | 45 | PE | 15 | 62 | 15 | Very hard | — | 1.6 |
| 55 | HD | 20 | DPG | 10 | " | 55 | PE | 15 | 70 | 15 | " | 1.8 | 0.4 |

[a]NPG — neopentyl glycol polyfumarate
[b]HD — 1,6-Hexanediol polyfumarate
[c]percent by weight based on monomer, polyesters, and thermoplastic.
[d]PG — propylene glycol-maleic anhydride polyester
[e]DPG — dipropylene glycol-maleic anhydride polyester
[f]PE — polyethylene powder
[g]LPS-40 — vinyl acetate copolymer
[h]CaCO₃ filler, wt. % based on resin plus filler
[i]¼-in. chopped strand fiber glass, wt. % based on resin plus filler plus glass
[j]linear shrinkage after molding in mils/in.

The compositions indentified in Table 6 could be molded under pressure and heat, for example, about 300°F, in sheet form; or the sheet could be cut into small pieces for molding and curing; or the sheet could be broken into random, fibrous clumps by mechanical devices such as a double arm mixer or a twin shell blender equipped with an intensive mixing agitator for molding.

EXAMPLE 56

A resin mix, as described in Example 39, was charged to a sigma blade mixer equipped with a jacket heated by wet steam. After the mix was heated to 75°C, 15% by weight of ⅛-in. chopped fiber glass strands were added and the resulting mix was agitated for 1 min. Thereafter, it was cooled to room temperature by passing water through the mixer jacket over a period of about 25 min. The resulting product consisted of wafer or disk shaped particles averaging about ¼inch in diameter. The particles were dry to the touch and free-flowing. The particles were compression molded and cured at 300°F into panels with excellent surface smoothness. The panels had the following properties: flexural strength—8400 psi; flexural modulus-1.2 × 10 psi; and Izod impact strength — 3.9 ft lbs/in of notch. Injection molding of the curable particles at 325°F mold temperature and varying conditions of barrel temperature and injection rate yielded molded parts with Izod impact values averaging 4.1 ft lbs/in of notch.

EXAMPLE 57

The disc shaped particles described in Example 56 were converted into a hard, stiff curable rope (diameter — about 0.5 inch) by extruding them at 50°–60°C in an extruder. Panels molded and cured at 300°F/300 psi from the extruded rope had: 8,600 psi-flexural strength; 1.34 × 10$^6$ psi-fluxural modulus; and 3.2 ft. lbs/in of notch Izod impact strength.

EXAMPLE 58

1,6-hexanediol polyfumarate powder (20 parts), dipropylene glycol-maleic anhydride polyester (10 parts), t-butyl perbenzoate (1.0 part), mono-t-hydroquinone (0.020 part), benzoquinone (0.015 part) and vinyl toluene (55 parts) were agitated at room temperature to dissolve soluble components. (The crystalline polyester which was dispersed, but not dissolved, separated if the mixture was allowed to stand.) Chopped fiberglass strands (15% by weight) were added and mixed as the temperature was raised to 80°C by heating on a steam bath for about 10 minutes. When allowed to cool, a smooth, buttery, non-separating mass was formed. The resin-glass mass was intensively mixed in a dough mixer with 15 parts of polyethylene powder, 2.0 parts of zinc stearate and 233 parts of calcium carbonate filler, yielding a lumpy, non-tacky, semi-solid. The product could be converted to a dry, relatively hard sheet by heating and compressing in the manner described in aforementioned examples.

EXAMPLE 59

A liquid resin mix as described in Example 41 and having a Brookfield viscosity of 16,000 cp at room temperature was introduced to the feed port of an NRM, 1-inch diameter screw extruder fitted with a ⅛-in. circular die and 2 heating zones. The screw was driven at 50 rpm. The rear zone barrel temperature was adjusted to about 70°C and the metering zone to 60°C. The warm extrudate was easily cut into cylindrical pellets by a knife blade wiping across the die face. The cooled curable pellets were dry, relatively hard and non-blocking upon storage. They tended to break easily under crushing or impact force.

EXAMPLE 60

A granular solid, as described in Example 39, was extruded, as described in Example 59. Extrusion was continued while the front zone barrel temperature was gradually reduced. The cooled, curable extrudate became softer as the front zone temperature was decreased. At 40°C, the cooled extrudate was a very stiff putty; at 50°C it was moderately hard, deforming under moderate pressure or impact force without breaking.

EXAMPLE 61

A liquid resin mix as described in Example 41 was placed in a deep pan. Continuous, silane-sized, multiple strand fiber glass roving was threaded through a series of guides, so arranged that the roving passed through the bath of resin, thence through a stainless steel die. The die consisted of heavy wall tubing, 0.125 ID × 0.375 OD ×12-in length, with a smooth, tapered entrance. The section of die through which the roving first passed was heated to an internal wall temperature of about 94°C, with heat conveniently supplied by an external, concentric jacket, 9-in. long, through which steam was passed. The section of die through which the roving exited was fitted with a second, independent jacket, 3-in. in length, through which cooling water was circulated.

Roving was pulled at about 30 in/min. through the bath, wherein it was saturated with the resin mix, thence through the heated section of the die, wherein the resin impregnated composite was heated to effect solution of the particles of 1,6-hexanediol polyfumarate, thence through the cooled section of die, wherein rapid solidification occurred. on exiting from the die, the impregnated roving was hard, dry to the touch and non-tacky, having the form of a smooth, stiff, cylindrical curable rod, ⅛-in. in diameter. Chopping into ½-in. lengths yielded free-flowing, cylindrical pellets, containing 12% of glass by weight. The pellets were molded and cured at 300°F and 300 psi pressure for about 3 min. into a cured panel which was free of cracks and which had a smooth surface and low linear shrinkage (0.0003 in/in).

EXAMPLE 62

The procedure described in Example 61 was repeated with the following changes: (1) the liquid resin mix contained 65 wt. % of filler, (2) the exit die section was cooled by ambient air and the roving was pulled through the resin bath and die at about 60 in/min.

Impregnated roving exiting from the die was warm, and somewhat tacky. In ambient air, it cooled to a non-tacky state at a distance of about 50 in from the die exit. The cooled, impregnated curable roving was soft, flexible and irregular in cross-section, relative to the product of Example 61. It was wound onto a spool. Cutting of the curable roving into ¼ - ½ in lengths yielded non-tacky, chopped, curable resin coated strands.

The present invention is particularly suited to the preparation of curable rods according to the process described in Examples 61 and 62 above. In such a process, that is, one in which roving is passed through a bath of resin composition, it is very important that the resin composition have a viscosity sufficiently low to well wet or thoroughly impregnate the roving. Such low viscosity compositions can be readily formulated in accordance with the present invention. Although the polyester resin baths of Examples 61 and 62 could be heated as roving is passed therethrough, heating is not necessary. In preparing a bath of polyester resin for use in a process of the type described in Examples 61 and 62, the crystalline polyester and other solid and insoluble ingredients should be in very small particle size. The smaller the particle size, the more readily the solids will be dispersed in the composition. The resin bath can be stirred in the event that the crystalline polyester or other insoluble solids have a tendency to settle from the liquid phase.

In summary, it can be said that the present invention provides a number of basic improvements over known methods for preparing solid curable polyester resin compositions which contain a crystalline polyester. Among the more important advantages provided by the present invention are the ability to form curable solids having a relatively high degree of hardness or solidity from a resin mix which contains a relatively high amount of liquid monomer and/or a relatively low amount of filler, and the ability to provide a resin mix which initially has a relatively low viscosity, thereby permitting fillers and/or fibrous reinforcements to be well wetted or impregnated. These characteristics of the present invention contribute to ease of preparation of curable polyester resin solids from which articles having improved properties can be made.

I claim:
1. A process for preparing a solid curable polyester resin composition comprising:
  A. mixing solid particles of an ethylenically unsaturated crystalline polyester with an ethylenically unsaturated liquid crosslinking agent wherein said polyester is insoluble in said crosslinking agent at room temperature, thereby forming a mixture which contains said solid particles of said crystalline polyester;
  B. heating said mixture containing said solid particles of said crystalline polyester and liquid crosslinking agent to a temperature at which said solid particles of said crystalline polyester dissolves in said crosslinking agent and a temperature which is below that at which the polyester and crosslinking agent cure, thereby forming a heated liquid solution of said polyester and said crosslinking agent;
  C. forming an uncured solid solution of said polyester and crosslinking agent by cooling the heated solution thereof; and
  D. mixing with the polyester and crosslinking agent prior to the formation of said solid solution one or more of a filler or fibrous reinforcements, thereby impregnating said filler or fibrous reinforcements or mixture thereof with said heated liquid solution; and to thereby provide a solid curable polyester resin composition in which said filler or said fibrous reinforcements or said mixture thereof is thoroughly impregnated with said solid solution.

2. A process according to claim 1 wherein one or more of said filler or fibrous reinforcements is mixed with said mixture of polyester and crosslinking agent prior to the heating thereof.

3. A process according to claim 2 wherein said crystalline polyester is a polyfumarate of: 1,6-hexanediol; neopentyl glycol; bis-(hydroxyethyl) resorcinol; ethylene glycol; 1,4-butanediol; 1,4-cyclohexanediol or bis-(hydroxyethyl) hydroquinone; or a mixture of one or more of said crystalline polyesters.

4. A process according to claim 2 wherein said crystalline polyester is a polyfumarate of 1,6-hexanediol or of neopentyl glycol.

5. A process according to claim 1 wherein said crystalline polyester is a neat crystalline polyester.

6. A process according to claim 2 wherein said crystalline polyester is a neat crystalline polyester.

7. A process according to claim 6 wherein said composition comprises about 2 to about 70 wt. % of said crystalline polyester; about 6 to about 80 wt. % of said crosslinking agent; 0 to about 75 wt. % of filler; 0 to about 30 wt. % of amorphous polyester and 0 to about 20 wt. % of an anti-shrink polymer.

8. A process according to claim 7 wherein said composition includes also 0 to about 60 wt. % fibrous reinforcements based on the total weight of the stated ingredients.

9. A process according to claim 6 wherein said composition comprises about 3 to about 25 wt. % of said crystalline polyester; about 10 to about 50 wt. % of said crosslinking agent; about 30 to about 75 wt. % of said filler; and about 2 to about 12 wt. % of an anti-shrink polymer.

10. A process according to claim 9 wherein said composition includes also about 10 to about 50 wt. % of fibrous reinforcements based on the total weight of the stated ingredients.

11. A process according to claim 10 wherein said ingredients are present in proportions to provide non-tacky, free-flowing powders, granules or pellets.

12. A process according to claim 6 wherein each of said ingredients is mixed with said crystalline polyester and crosslinking agent prior to the formation of said solid solution, wherein said crystalline polyester is a polyfumarate of 1,6-hexanediol or neopentyl glycol, wherein said crosslinking agent is styrene or vinyltoluene or a mixture thereof, wherein said fibrous reinforcements are glass fibers, and wherein a curing catalyst is mixed with said ingredients prior to the formation of said solid solution.

13. A process according to claim 1 comprising passing strands or roving of said fibrous reinforcements through a composition containing said solid crystalline polyester, said liquid crosslinking agent, said filler and optionally, an amorphous polyester, thereby impregnating said strands or roving with said composition, forming said impregnated strands or roving into a predetermined shape while heating said impregnated strands or roving to a temperature as set forth in claim 1, and thereafter forming said solid solution as set forth in claim 1.

14. A non-tacky solid curable polyester resin composition comprising filler, and optionally fibrous reinforcements, impregnated with a solid solution formed from a neat crystalline ethylenically unsaturated polyester and liquid ethylenically unsaturated cross-linking agent therefor, wherein at room temperature said neat crystalline polyester is a solid and is insoluble in said liquid cross-linking agent and wherein said filler, and said fibrous reinforcements if present, are impregnated also with said liquid cross-linking agent, and wherein said composition comprises about 2 to about 70 wt. % of said crystalline polyester; about 6 to about 80 wt. % of said cross-linking agent; about 30 to about 75 wt. % of said filler; about 2 to about 30 wt. % of amorphous polyester and 0 to about 20 wt. % of an anti-shrink polymer, and based on the total weight of the aforementioned ingredients 0 to about 60 wt. % of said fibrous reinforcements, and wherein the weight ratio of said crystalline polyester and said amorphous polyester to said cross-linking agent is not in excess of about 3 to 1.

15. A composition according to claim 14 wherein said crystalline polyester is a polyfumarate of: 1,6-hexanediol; neopentyl glycol; bis-(hydroxyethyl) resorcinol; ethylene glycol; 1,4-butanediol; 1,4-cyclohexanediol or bis-(hydroxyethyl) hydroquinone; or a mixture of one or more of said crystalline polyesters.

16. A composition according to claim 14 comprising about 3 to about 25 wt. % of said crystalline polyester; about 10 to about 50 wt. % of said crosslinking agent; about 30 to about 75 wt. % of said filler; and about 2 to about 12 wt. % of an anti-shrink polymer.

17. A composition according to claim 16 including also about 10 to about 50 wt. % of fibrous reinforcements based on the total weight of the stated ingredients.

18. A composition according to claim 16 in the form of non-tacky, free-flowing powders, granules, or pellets.

19. A composition according to claim 17 in the form of non-tacky, free-flowing powders, granules or pellets.

20. A composition according to claim 14 wherein said weight ratio is not in excess of about 1.5 to 1.

21. A composition according to claim 14 wherein said crystalline polyester is a polyfumarate of 1,6-hexanediol or of neopentyl glycol, wherein said crosslinking agent is styrene or vinyltoluene or a mixture thereof, and wherein said fibrous reinforcements are glass fibers.

22. A composition according to claim 17 wherein said crystalline polyester is a polyfumarate of 1,6-hexanediol or of neopentyl glycol, wherein said crosslinking agent is styrene or vinyltoluene or a mixture thereof, and wherein said fibrous reinforcements are glass fibers.

23. A process according to claim 6 including forming said impregnated fibrous reinforcements or filler or mixture thereof, and also an amorphous polyester, into curable free-flowing powders, granules or pellets.

24. A process according to claim 6 including forming said impregnated fibrous reinforcements or filler or mixture thereof, and also an amorphous polyester, into a solid curable non-tacky sheet.

25. A process according to claim 6 including forming said impregnated fibrous reinforcements or filler or mixture thereof, and also an amorphous polyester, into a solid curable rod.

26. A process according to claim 25 wherein said solid curable rod is stiff.

27. A process according to claim 25 wherein said curable rod is flexible and is capable of being wound on a spool.

28. A process according to claim 6 including forming said impregnated fibrous reinforcements or filler or mixture thereof, and also an amorphous polyester, into a hard, stiff, curable rope.

29. A process according to claim 25 wherein said mixture includes fibrous reinforcements disposed longitudinally in said rod.

30. A composition according to claim 14 in the form of free-flowing powders, granules or pellets.

31. A composition according to claim 14 in the form of a solid, curable, non-tacky sheet.

32. A composition according to claim 14 in the form of a solid, curable rod.

33. A composition according to claim 32 wherein said rod is stiff.

34. A composition according to claim 32 wherein said rod is flexible and is capable of being wound on a spool.

35. A composition according to claim 14 in the form of a hard, stiff, curable rope.

36. A composition according to claim 32 including fibrous reinforcements disposed longitudinally in said rod.

37. A process according to claim 5 wherein said mixture is heated above about 45°C and wherein upon cooling said heated solution, the solidification of said uncured liquid solution is substantially completed above room temperature.

38. A process according to claim 37 wherein said solidification is substantially completed at a temperature of about 45°C.

39. A process according to claim 6 wherein said mixture is heated above about 45°C and wherein upon cooling said heated solution, the solidification of said uncured liquid solution is substantially completed above room temperature.

40. A composition according to claim 14 characterized by being in said solid form at a temperature of about 45°C.

41. A composition according to claim 16 characterized by being in said solid form at a temperature of about 45°C.

42. A process according to claim 5 wherein said neat crystalline polyester is a polyfumarate of neopentyl glycol or 1,6-hexane diol and wherein upon cooling said heated solution, said solid curable polyester resin composition is non-tacky at a temperature of about 50°–55°C.

43. A process according to claim 6 wherein said neat crystalline polyester is a polyfumarate of neopentyl glycol or 1,6-hexane diol and wherein upon cooling said heated solution, said solid curable polyester resin composition is non-tacky at a temperature of about 50°–55°C.

44. A composition according to claim 14 wherein said crystalline polyester is a polyfumarate of neopentyl glycol or 1,6-hexane diol and wherein said composition is non-tacky at a temperature of about 50°–55°C.

45. A composition according to claim 16 wherein said crystalline polyester is a polyfumarate of neopentyl glycol or 1,6-hexane diol and wherein said composition is non-tacky at a temperature of about 50°–55°C.

46. A process according to claim 1 wherein said composition includes one or more additives selected from the group consisting of catalyst, cross-linking and stabilizing inhibitor, accelerator, pigment, and mold-release additive.

47. A process according to claim 2 wherein said composition includes one or more additives selected from the group consisting of catalyst, cross-linking and stabilizing inhibitor, accelerator, pigment, and mold-release additive.

48. A composition according to claim 14 including one or more additives selected from the group consisting of catalyst, cross-linking and stabilizing inhibitor, accelerator, pigment, and mold-release additive.

49. A process according to claim 37 wherein said composition includes one or more additives selected from the group consisting of catalyst, cross-linking and stabilizing inhibitor, accelerator, pigment, and mold-release additive.

50. A composition according to claim 40 including one or more additives selected from the group consisting of catalyst, cross-linking and stabilizing inhibitor, accelerator, pigment, and mold-release additive.

51. A process according to claim 42 wherein said composition includes one or more additives selected from the group consisting of catalyst, cross-linking and stabilizing inhibitor, accelerator, pigment, and mold-release additive.

52. A composition according to claim 44 including one or more additives selected from the group consisting of catalyst, cross-linking and stabilizing inhibitor, accelerator, pigment, and mold-release additive.

* * * * *